United States Patent [19]

Krueger

[11] Patent Number: 5,264,461

[45] Date of Patent: Nov. 23, 1993

[54] INTEGRAL SKIN RIGID POLYURETHANE STRUCTURAL FOAM

[75] Inventor: David C. Krueger, Grosse Ile, Mich.

[73] Assignee: BASF Corporation, Parsippany, N.J.

[21] Appl. No.: 914,829

[22] Filed: Jul. 15, 1992

[51] Int. Cl.⁵ .............................................. C08G 18/14
[52] U.S. Cl. ....................................... 521/51; 521/167; 521/174
[58] Field of Search ........................... 521/51, 167, 174

[56] References Cited

U.S. PATENT DOCUMENTS

| | | |
|---|---|---|
| 4,588,803 | 5/1986 | Christman ............................ 521/164 |
| 4,605,725 | 8/1986 | Christman ............................ 528/77 |
| 4,780,482 | 10/1988 | Krueger ................................ 521/51 |

*Primary Examiner*—Maurice J. Welsh
*Attorney, Agent, or Firm*—Dennis V. Carmen

[57] ABSTRACT

The invention relates to rigid integral skin polyurethane structural foam having high impact strength, high heat distortion, and flame retardant properties. The foam is prepared from triisopropanolamine-initiated polyoxyalkylene (TIPA) polyether polyols oxyalkylated with a compound producing primary hydroxyl functional termination. The polyether polyol is advantageously of a molecular weight sufficient to enable TIPA to flow well while retaining its flame retardant characteristics in the foam.

12 Claims, No Drawings

5,264,461

INTEGRAL SKIN RIGID POLYURETHANE STRUCTURAL FOAM

BACKGROUND OF THE INVENTION

1. Field of the Invention

The present invention pertains to integral skin rigid polyurethane structural foam compositions. More particularly, the present invention relates to the preparation of integral skin rigid polyurethane structural foam which contains polyether polyol prepared by ethoxylating triisopropanolamine, an organic polyisocyanate, a blowing agent, catalyst, and optionally a chain extender.

2. Description of Prior Art

The use of triisopropanolamine (TIPA) in combination with alkylene oxide adducts of aliphatic and aromatic amines has been disclosed in the prior art. U.S. Pat. No. 4,588,803 teaches the preparation of low shrinkage polyurethane sealant compositions employing, among other reactants, ethylene oxide adducts of toluenediamine and triisopropanolamine. U.S. Pat. No. 4,605,725 teaches the preparation of polyurethane sealant compositions employing alkylene oxide adducts of monoethanolamine blended with triisopropanolamine. U.S. Pat. No. 4,780,482 teaches the use of TIPA as a chain extender in rigid integral skin polyurethane foams to impart flame retardancy. The inventor has now found that TIPA used as an initiator in the preparation of polyether polyols also imparts good flame retardancy.

SUMMARY OF THE INVENTION

The present invention applies to integral skin rigid polyurethane structural foam compositions, prepared by reacting a triisopropanolamine-initiated polyoxyalkylene polyether polyols containing primary hydroxyl group termination with an organic polyisocyanate in the presence of an effective amount of a catalyst.

For a more complete understanding of the present invention, reference is made to the following detailed description and the examples thereof:

DESCRIPTION OF THE PREFERRED EMBODIMENTS

In the preparation of integral skin rigid polyurethane structural foam products of high impact strength, it has unexpectedly been found that high heat distortion and flame retardant properties are obtained by reacting (a) a polyol prepared by at least terminally oxyalkylating triisopropanolamine with an alkylene oxide producing primary hydroxyl groups,
(b) an organic polyisocyanate,
(c) a catalyst,
(d) a blowing agent, and
(e) optionally pigment, flame retardant, and chain extender.

By reacting triisopropanolamine with an alkylene oxide producing primary hydroxyl groups, triisopropanolamine is converted from a solid to a liquid, thereby improving the flow of the resin over a conventional resin to which solid TIPA is added. When solid TIPA is added to the resin, the viscosity increases; whereas adding TIPA in the form of a polyol reduces the viscosity and improves flow. It was surprising to find that TIPA, even when reacted as an initiator with an alkylene oxide, also improves the flame retardancy of the foam.

The polyol used in the integral skin rigid polyurethane structural foam of the invention may be prepared by the catalytic condensation of an alkylene oxide or mixture of alkylene oxides either simultaneously or sequentially with triisopropanolamine. General methods of polyether polyol preparation may be found in U.S. Pat. Nos. 1,922,459, 3,190,927, and 3,346,557, incorporated herein by reference. The alkylene oxides are added in such a manner as to produce a polyether polyol having primary hydroxyl group termination. This may be accomplished by terminating the reaction between triisopropanolamine and other alkylene oxides with ethylene oxide and/or tetrahydrofuran, or merely reacting ethylene oxide and/or tetrahydrofuran with triisopropanolamine throughout the procedure.

Internal blocks of polyoxyalkylene groups prepared using propylene oxide or butylene oxide are suitable as long as the polyether polyols are terminated with primary hydroxyl groups in an amount of at least 5 weight percent, preferably 10 weight percent, more preferably 20 weight percent. However, it is preferred that the polyether polyols be prepared exclusively with primary hydroxyl-yielding alkylene oxides, namely, ethylene oxide or tetrahydrofuran. The triisopropanolamine-initiated polyether polyols preferably have a hydroxyl number of from 300 to 700 and molecular weights of from 240 to about 560. Accordingly, from about 0.5 moles to 8 moles of alkylene oxide, such as ethylene oxide, are reacted with 1 mole of triisopropanolamine. Preferably, greater than 50 weight percent, more preferably greater than 80 weight percent, of the species comprise triisopropanolamine-initiated polyether polyols having one or two of the hydroxyl hydrogens reacted with alkylene oxide.

Suitable amounts of triisopropanolamine-initiated polyoxyalkylene polyether polyols containing primary hydroxyl groups, based on the weight of all (a) polyoxyalkylene polyether polyols and polyester polyols, is about 60 weight percent or more, preferably 80 weight percent or more, more preferably 85 weight percent or more. Less than 60 weight percent may be employed, however, flame retardancy characteristics of the foam become unreliable.

The triisopropanolamine-initiated polyether polyol may be blended with other conventional polyether and polyester polyol additives. Representative additive polyols include polyhydroxyl-containing polyesters, polyoxyalkylene polyether polyols, polyhydroxyterminated polyurethane polymers, polyhydroxyl-containing phosphorous compounds, and alkylene oxide adducts of polyhydric polythioesters, polyacetals, aliphatic polyols and thiols, ammonia, and amines including aromatic, aliphatic, and heterocyclic amines as well as mixtures thereof. Alkylene oxide adducts of compounds which contain two or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used.

The alkylene oxide adducts of amines are prepared by reacting the alkylene oxides with 2,3-, 2,6-, 3,4-, 2,5-, and 2,4-toluenediamine, ethylene diamine and diaminodiphenylmethane. The procedures employed are those well known to those skilled in the art.

Any suitable alkylene oxide may be used in the additive polyol such as ethylene oxide, propylene oxide, butylene oxide, amylene oxide, and mixtures of these oxides. Preferred are ethylene oxide and propylene oxide wherein the ethylene oxide content is less than about 35 weight percent of the adduct. The molecular weights of these adducts may range from about 400 to about 800. Polyoxyethylene polyester polyols, other than those derived from the diamines, are also employed in conjunction with the adducts of the diamines. The amounts of these non-amine polyols may range from about 0 weight percent to about 50 weight percent based on the total weight of the foam composition. The molecular weight of these polyols may range from about 200 to about 1,000.

Any suitable hydroxy-terminated polyester may be used as an additive polyol such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha,\beta$-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, $\alpha$-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Other polyesters which may be employed are the mixed polyesters derived from the "bottoms" obtained by the transesterification of the dimethylterephthalate esters with diethylene glycol. One common designation is TERATE 203. Other polyesters which may be employed are the mixed polyester polyols derived from polyethylene terephthalate. Such polyesters are designated as Chardol 574, 570, and 740. These polyesters may have hydroxyl numbers from about 300 to about 800.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above; or they may be made using the same components that make up the hydroxyl-containing polyester with only a portion of the components being a diamine such as ethylene diamine.

Any suitable polyoxyalkylene polyether polyol additive may be blended, such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxylphenyl)propane and blends thereof having equivalent weights of from about 100 to about 1,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorous compounds which may be used include those compounds disclosed in U.S. Pat. No. 3,639,542. Preferred polyhydroxyl-containing phosphorous compounds are prepared from alkylene oxides and acids of phosphorous having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

The rigid integral skin polyurethane foam employed in the present invention is generally prepared by the reaction of the polyols with an organic polyisocyanate in the presence of a catalysts and a blowing agent and optionally in the presence of additional polyhydroxyl-containing components, chain-extending agents, surface-active agents, stabilizers, dyes, fillers, and pigments. Suitable processes for the preparation of cellular polyurethane foams are disclosed in U.S. Pat. No. Re. 24,514, together with suitable machinery to be used in conjunction therewith.

When water is added as the blowing agent, corresponding quantities of excess polyisocyanate to react with the water and produce carbon dioxide may be used. It is also possible to proceed with the preparation of the polyurethane foams by a prepolymer technique wherein an excess of organic polyisocyanate is reacted in a first step with the diamine adducts of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane heptane, pentene, and heptene; azo compounds such as axohexahydrobenzodinitrile; halogenated hydrocarbons such as dichlorodifluoromethane, trichlorofluoromethane, dichlorodifluoroethane, vinylidene chloride, and methylene chloride may be used as blowing agents. A combination of blowing agents may also be employed.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures or 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyldiisocyanate, and 3,3'-dimethyldiphenylmethane-4,4'-diisocyanate; the triisocyanates such as 4,4'4"-triphenylmethane triisocyanate, and toluene-2,4,6-triisocyanate; and the tetraisocyanates such as 4,4'-dimethyldiphenylmethane-2,2'-5,5'-tetraisocyanate; and polymeric polyisocyanates such as polymethylene polyphenylene polyisocyanate. Especially useful due to their availability and properties are toluene diisocyanate, 4,4'-diphenylmethane diisocyanate, and crude polymethylene polyphenylene polyisocyanate.

Other crude polyisocyanates may also be used in the compositions of the present invention, such as crude toluene diisocyanate obtained by the phosgenation of a mixture of toluene diamines.

Chain extending agents which may optionally be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, glycerine, trimethylolpropane, propylene glycol, 1,4-butanediol; and primary and secondary diamines such as phenylenediamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, 2-methylpiperazine, 2,3-, 2,6-, 3,4-, 2,5-, 2,4-toluenediamine, 2,4'- and 4,4'-diphenylmethanediamine.

An especially preferred group of chain extenders are glycerine and alkanolamines, such as triethanolamine and triisopropanolamine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, and the like. Other suitable catalysts are, for example, dibutyltin dilaurate, dibutyltindiacetate, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention since, in the absence of same, the foams may collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

The following examples illustrate the nature of the invention. All parts are by weight unless otherwise designated. The physical properties were determined using the following ASTM test methods: D1622; D1623, D790, D246.

The following abbreviations were employed in the examples below:

Polyol A is an ethylene oxide adduct of a 1:1 molar ratio of triisopropanolamine and diethylene glycol, having a hydroxyl number of 593 and employing 2 moles of ethylene oxide per 2 moles of the TIPA and DEG blend.

Polyol B is an ethylene oxide adduct of triisopropanolamine employing 1.5 moles of ethylene oxide per 1 mole of initiator, and having a hydroxyl number of 655.

Polyol C is a propylene oxide-ethylene oxide adduct of glycerine capped with 18.5 weight percent polyoxyethylene groups, and having a nominal hydroxyl number of 35.

Polyol D is a propylene oxide adduct of toluenediamine containing 90 weight percent vicinal isomers and having a hydroxyl number of 390.

Polyol E is a propylene oxide adduct of sucrose and dipropylene glycol and having a hydroxyl number of about 397.

Niax LHT-240 is a propylene oxide adduct of glycerine having a hydroxyl number of about 230, commercially available from Union Carbide Corporation.

Fyrol PCF is tris($\beta$-chloropropyl)phosphate sold by Stauffer Chemical Corporation.

L5420 is a silicone surfactant sold by Union Carbide Corporation.

R-11a is dichlorodifluoromethane.

DABCO 33LV is 33 percent triethylenediamine in dipropylene glycol sold by Air Products Corporation.

DABCO HB is an amine catalyst providing delayed cream or faster demold available from Air Products Corporation.

T-131 is an organotin catalyst sold by Air Products Corporation.

LUPRANATE ™ M20S is polymeric methylenediphenyl-diisocyanate (MDI) containing about 44 percent 2-ring MDI sold by BASF Corporation.

The following handmix procedure was employed to prepare samples 1–6. The indicated amounts of polyether polyol were poured into suitable mixing containers. To the proper containers were added the indicated amounts of blowing agent, surfactant, fire retardant, catalyst, and other additives, mixed well, and conditioned to room temperature (23° C.). The resins in the containers and polymeric MDI in the ratios indicated in the table were measured into one-half gallon paper cans, mixed for 10 to 15 seconds with a propeller or "Jiffy" mixer at nominally 3,000 rpm. Each of the resin/isocyanate mixtures were weighed into 55° C. preheated 2.5 cm×30.5 cm×30.5 cm or 12.5 cm×22.9 cm×22.9 cm metal plaque molds. The foams were allowed to rise and cure. Subsequently, the foam plaques were removed from the mold and allowed to age for at least seven days prior to physical testing. As is indicated in Table 1 below, the results show that Samples 2–4 possessed good flame retardancy, while comparative Sample 1, made with a polyol having mixed initiators, failed even though one of the initiators was TIPA.

TABLE I

|  | 1 | 2 | 3 | 4 |
|---|---|---|---|---|
| POLYOL A | 100 | — | — | — |
| POLYOL B | — | 85 | 60 | 50 |
| POLYOL C | — | — | 40 | 30 |
| POLYOL D | — | — | — | — |
| POLYOL E | — | — | — | 20 |
| LHT-240 | — | 15 | — | — |
| FYROL PCF | 10 | 10 | 10 | 10 |
| L5420 | 1.0 | 1 | 1 | 1 |
| R-11a | 12 | 12 | 13 | 13 |
| DABCO HB | 0.35 | — | — | 0.5 |
| DABCO 33LV | — | 0.5 | 0.5 | — |
| T-131 | — | — | 0.05 | 0.05 |
| R/T* | 100/122 | 100/122 | 125/107 | 125/110 |
| DENSITY (pcf) | 24 | 15 | 25 | 26 |
| TENSILE MOD. (psi) | 23800 | 10200 | 11100 | 13290 |
| STRENGTH (psi) | 1340 | 680 | 1074 | 980 |
| % ELONG. | 6.3 | 10.7 | — | — |
| FLEX MOD (psi) | 97800 | 43400 | 83400 | 85900 |
| STRENGTH (psi) | 2700 | 1410 | 3140 | 2800 |
| HDT (66 psi) °F. | 154 | 144 | 142 | 141 |
| IZOD | 0.6 | 0.5 | 0.5 | 0.8 |
| UL-94 V0 T1 (sec) | 15 | 2 | 1.4 | 2.8 |
| T2 (sec) | 24 | 2.6 | 1.4 | 2.8 |
| P/F | F | P-V0 | P-V0 | P-V1 |

*I: LUPRANATE ™ M20S

I claim:

1. A rigid integral skin polyurethane foam comprising the reaction product of:
   A) a polyol comprising a triisopropanolamine initiated polyoxyalkylene polyether polyol having primary hydroxyl group termination;
   B) an organic, aromatic polyisocyanate;
   C) a polyurethane-promoting catalyst;
   D) a blowing agent; and optionally,
   E) a chain extender, surfactant, pigment, and flame retardant.

2. The foam of claim 1, wherein the polyether polyols are prepared by oxyalkylating triisopropanolamine exclusively with ethylene oxide and/or tetrahydrofuran.

3. The foam of claim 2, wherein triisopropanolamine is ethoxylated to produce triisopropanolamine initiated polyoxyethylene polyether polyols.

4. The foam of claim 3, wherein 80 weight percent or more of the polyol comprises said triisopropanolamine-initiated polyoxyethylene polyether polyols, based on the weight of A) ingredients.

5. The foam of claim 3, wherein the polyether polyol has a hydroxyl number of 300 to 700.

6. The foam of claim 2, further containing a chain-extender selected from the group consisting of triethanolamine, glycerine, and triisopropanolamine.

7. A process for the preparation of rigid integral skin polyurethane foams comprising reacting in a mold preheated from 35° C. to 85° C.:
   A) a polyol comprising a triisopropanolamine initiated polyoxyalkylene polyether polyol having primary hydroxyl group termination;
   B) an organic, aromatic polyisocyanate;
   C) a polyurethane-promoting catalyst;
   D) a blowing agent; and optionally,
   E) a chain extender, surfactant, pigment, and flame retardant.

8. The process of claim 7, wherein the polyether polyols are prepared by oxyalkylating triisopropanolamine exclusively with ethylene oxide and/or tetrahydrofuran.

9. The process of claim 8, wherein triisopropanolamine is ethoxylated to produce triisopropanolamine initiated polyoxyethylene polyether polyols.

10. The process of claim 9, wherein 80 weight percent or more of the polyol comprises said triisopropanolamine-initiated polyoxyethylene polyether polyols, based on the weight of A) ingredients.

11. The process of claim 9, wherein the polyether polyol has a hydroxyl number of 300 to 700.

12. The process of claim 8, further containing a chain-extender selected from the group consisting of triethanolamine, glycerine, and triisopropanolamine.

* * * * *